United States Patent [19]

Yamakawa

[11] Patent Number: 5,796,237

[45] Date of Patent: Aug. 18, 1998

[54] EFFICIENCY CONTROL SYSTEM FOR AN INDUCTION MOTOR

[75] Inventor: Katsumi Yamakawa, Kanagawa-ken, Japan

[73] Assignee: Tajima Engineering Kabushiki Kaishya, Japan

[21] Appl. No.: 615,014

[22] Filed: Mar. 12, 1996

[30] Foreign Application Priority Data

Mar. 13, 1995 [JP] Japan ................................ 7-079383

[51] Int. Cl.$^6$ ........................................................ H20P 5/34
[52] U.S. Cl. .............................. 318/806; 318/807; 318/799
[58] Field of Search ............................ 318/803, 806,
318/805, 807, 808, 809, 811, 810, 800,
799, 801, 437

[56] References Cited

U.S. PATENT DOCUMENTS

| | | | |
|---|---|---|---|
| 4,387,421 | 6/1983 | Zach et al. | 318/811 |
| 4,450,398 | 5/1984 | Bose | 318/803 |
| 4,785,213 | 11/1988 | Satake | 318/437 |
| 4,823,066 | 4/1989 | Yoshiki et al. | 318/808 |
| 5,272,429 | 12/1993 | Lipo et al. | 318/808 |

*Primary Examiner*—John W. Cabeca
*Attorney, Agent, or Firm*—Price, Heneveld, Cooper, DeWitt & Litton

[57] ABSTRACT

An efficiency control system for an induction motor system includes an induction motor, a power transducer connected to the induction motor, and a detector adapted for separate real-time detection of a voltage signal, a current signal, and a frequency signal of electric power supplied from the power transducer to the induction motor so that an output of the induction motor during operation may be controlled by these signals in response to a load torque. The efficiency control system includes an actual slip signal processor for calculating an actual slip of the induction motor during operation on the basis of a motor constant and the voltage signal, current signal, and frequency signal of the electric power supplied from the power transducer to the induction motor. The efficiency control system further includes an optimum slip signal processor for calculating an optimum slip desired to obtain the maximum efficiency of the induction motor. Additionally, the efficiency control system includes a voltage command signal transmitter for generating and transmitting a voltage command signal to the power transducer, where the voltage command signal includes a scalar value calculated by the voltage command signal transmitter. The power transducer adjusts the electrical power supplied to the induction motor in response to the scalar value of the voltage command signal such that the slip of the induction motor is maintained at the optimum value in order to operate the induction motor at the maximum efficiency for a given load torque.

10 Claims, 1 Drawing Sheet

EFFICIENCY CONTROL SYSTEM FOR AN INDUCTION MOTOR

BACKGROUND OF THE INVENTION

The present invention relates to an efficiency control system that is responsive to a load variation to control an induction motor having a power transducer so as to operate at the optimum efficiency.

Many types of output control systems are available including one that is adapted to supply an induction motor with electric power via an invertor and to control an output of the induction motor in response to variations in a load torque. In such a control system, a problem results from having a ratio between output voltage and output frequency of the invertor fixed to a predetermined value.

An improvement in this conventional control system has been contemplated in which the desired efficiency control is achieved by detecting an output signal of the electric power supplied from the invertor to the induction motor and calculating an equivalent impedance of the induction motor on the basis of the output signal as well as a motor constant. This improved control system has aimed to achieve a higher efficiency of the induction motor by utilizing the equivalent impedance which varies in response to variations in the load torque of the induction motor to control the voltage applied to the induction motor.

An alternative arrangement of such control system has also been contemplated in which, instead of the equivalent impedance, an excitation current of the induction motor is calculated and the voltage applied to the induction motor is controlled by varying the excitation current in response to variations in the load torque of the induction motor.

Furthermore, there has also been proposed a control system including a speed sensor mounted on the induction motor to continuously measure a revolution speed of its shaft (i.e., rotor) and thereby to detect a slip on the basis of which a slip frequency serving to correct a torque of the induction motor is controlled according to a voltage command applied to the induction motor.

However, in the case of the output control system for the induction motor adapted to supply the induction motor with electric power via the invertor and to control the output of the induction motor in response to variation in the load torque, it has been impossible to obtain an adequately high efficiency particularly when the variation in the load torque is relatively significant, since the ratio between output voltage and output frequency of the invertor is fixed to a predetermined value.

The improved control system which detects the output signal of electric power supplied from the invertor to the induction motor and calculates the equivalent impedance on the basis of the output signal as well as the motor constant so that the voltage applied to the induction motor may be controlled by the equivalent impedance is certainly advantageous in that the equation used to calculate the equivalent impedance is relatively simple. However, a problem lies in the fact that variation in the load torque is not directly related to variation in the equivalent impedance.

The control system in which the excitation current is variable has been also accompanied with the same problem as that encountered by the previously mentioned system.

The control system comprising the speed sensor mounted on the induction motor to continuously measure the revolution speed of its shaft (i.e., rotor) and thereby to detect the slip on the basis of which the slip frequency serving to correct the torque of the induction motor is controlled according to the voltage command applied to the induction motor is possibly one of the most desirable systems. However, with this control system, the speed sensor must be inconveniently mounted on the induction motor.

In general, when the induction motor is used as a driving source for industrial machinery inevitably accompanied with variation in the load torque, it is very important that the induction motor can be controlled by the control system of an arrangement as simple as possible to operate at the maximum efficiency in response to variation in the load torque.

SUMMARY OF THE INVENTION

In order to solve the problems described above, it is a principal object of the invention to provide an efficiency control system for induction motor adapted to calculate a slip and the optimum slip of the induction motor, to maintain the slip at the optimum value in response to variation in a load torque of the induction motor and to cooperate with a power transducer to control voltage applied to the induction motor so as to obtain the maximum efficiency.

The object of the invention set forth above is achieved, according to the invention, by an efficiency control system for an induction motor system having an induction motor, a power transducer connected to said induction motor, and a detector adapted for separate real-time detection of a voltage signal, a current signal, and a frequency signal of electric power supplied from the power transducer to the induction motor so that an output of the induction motor during operation may be controlled by these signals in response to a load torque. The efficiency control system includes an actual slip signal processor for calculating an actual slip of said induction motor during operation on the basis of the voltage signal, current signal, and frequency signal of the electric power supplied from the power transducer to the induction motor and a motor constant, an optimum slip signal processor for calculating an optimum slip desired to obtain the maximum efficiency of the induction motor, and a voltage command signal transmitter for generating and transmitting a voltage command signal to the power transducer. The voltage command signal includes a scalar value calculated by the voltage command signal transmitter. The power transducer adjusts the electrical power supplied to the induction motor in response to the scalar value of the voltage command signal such that the slip of the induction motor is maintained at the optimum value in order to operate the induction motor at the maximum efficiency for a given load torque.

The actual slip signal processor calculates the actual slip $S(n)$ at a particular point in time n, of the induction motor using the equation:

$$S(n) = \frac{R_1 \cdot X_m(n) + \sqrt{(R_1 \cdot X_m(n))^2 + \left\{ \left(\frac{V_1(n)}{I_1(n)}\right)^2 - (R_1^2 + X_1^2(n)) \right\} \cdot \left[ \{R_1^2 + (X_1(n) + X_m(n))^2\} - \left(\frac{V_1(n)}{I_1(n)}\right)^2 \right]}}{\left\{ \left(\frac{V_1(n)}{I_1(n)}\right)^2 - (R_1^2 + X_1^2(n)) \right\} \cdot \left\{ \frac{X_m(n)}{R_{21}} \right\}} \quad (1)$$

where $V_1(n)$ represents the voltage level of the detected voltage signal at time n, $I_1(n)$ represents the current level of the detected current signal at time n, $R_1$ represents a motor constant, which is the resistance of the stator of the induction motor, $R_{21}$ represents a motor constant, which is the resistance of the rotor of the induction motor, $X_1(n)$ represents a primary leakage reactance of the stator at time n, and $X_m(n)$ represents a mutual reactance of the stator and rotor at time n.

The optimum slip signal processor calculates the optimum slip S* (n+1) at a particular point in time n+1 occurring after time n, using the equation:

$$S^*(n+1) = \frac{\left(\frac{R_{21}}{X_m(n+1)}\right)^2}{\frac{R_{21}}{R_1} + 1} \left\{ \sqrt{\frac{\frac{R_{21}}{R_1} + \left(\frac{R_{21}}{X_m(n+1)}\right)^2 + 1}{\left(\frac{R_{21}}{X_m(n+1)}\right)^2}} - 1 \right\} \quad (2)$$

where $X_m(n+1)$ represents a mutual reactance of the stator and rotor at time n+1.

The voltage command signal transmitter calculates the scalar value $|V_1|(n+1)$ for a particular point in time n+1 occurring after a present time n, using the equation:

DESCRIPTION OF THE PREFERRED EMBODIMENT

Figure 1:
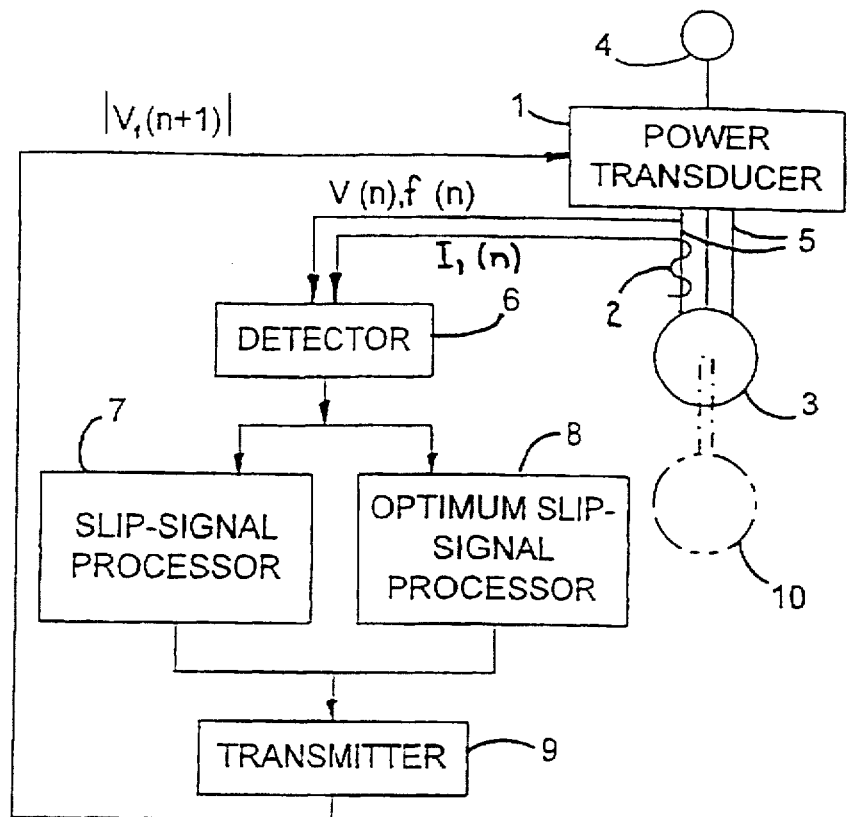
FIG. 1 is a block diagram illustrating an efficiency control system arranged according to the present invention for induction motor.

An efficiency control system of the invention for an induction motor is arranged as illustrated by FIG. 1, in which reference numeral 1 designates a power transducer. In the specific embodiment described herein, a PWM invertor is employed as the power transducer 1. The PWM invertor may have any conventional structure. Reference numeral 3 designates a three-phase induction motor. The power transducer 1 inverts voltage as well as frequency of power received from a power supply 4 and supplies the three-phase induction motor 3 with three-phase power via three-phase ACV cable 5. As illustrated, a load 10 is connected to the three-phase induction motor 3.

Based on signals output from a detector terminal 2 on an end of the three-phase AC cable 5, a detector 6 detects in real $$|V_1|(n+1) = \sqrt{\frac{S(n) \cdot f(n) \left( \left\{ R_1 - \left(\frac{X_1^*(n) \cdot X_m^*(n)}{R_{21}}\right) S^*(n+1) \right\}^2 + \left\{ X_1^*(n) + X_m^*(n) + \left(\frac{R_1 \cdot X_m^*(n)}{R_{21}}\right) S^*(n+1) \right\}^2 \right)}{S^*(n+1) \cdot f^*(n+1) \left( \left\{ R_1 - \left(\frac{X_1(n) \cdot X_m(n)}{R_{21}}\right) S(n) \right\}^2 + \left\{ X_1(n) + X_m(n) + \left(\frac{R_1 \cdot X_m(n)}{R_{21}}\right) S(n) \right\}^2 \right)}} \times |V_1|(n) \quad (3)$$

where S(n) represents the actual slip calculated by the actual slip signal processor at time n, S* (n+1) represents the optimum slip calculated by the optimum slip signal processor for time n+1, $X_m^*$ (n) represents the optimum mutual reactance of the stator and rotor at time n, $|V_1|(n)$ represents a scalar value of the voltage level of the detected voltage signal at time n, $X_1^*$ (n) represents the optimum primary leakage reactance of the stator at time n, f(n) represents the frequency of the detected frequency signal at time n, and f* (n+1) represents an optimum frequency associated with the optimum slip S* (n+1) for the time n+1.

The invention allows the induction motor to be controlled so as to operate at an adequately high efficiency even when a load torque varies from time to time, since the actual slip and the optimum slip at every time point during operation of the induction motor are calculated on the basis of voltage, current, and frequency signals of the electric power supplied from the power transducer to the induction motor and the motor constant so that, based on the slip value, the voltage supplied from the power transducer may be controlled in response to variation in the load torque so as to obtain the maximum efficiency of the induction motor.

time, a voltage signal $V_1(n)$, a current signal $I_1(n)$ and a frequency signal f(n) of the supplied power at every time point during operation of the induction motor 3. Voltage signal $V_1$ and current signal $I_1$ are vector signals having respective phase angles. It should be understood that the reference symbol $V_1$ may be referred also as the voltage command signal or a primary voltage or voltage applied from the power transducer 1 to the three-phase induction motor 3. Detector 6 may be made using conventional voltage, current, and frequency sensors.

Detector 6 is connected to a slip signal processor 7 as well as to an optimum slip signal processor 8, which are connected, in turn, to a voltage command signal transmitter 9. Slip signal processor 7, optimum slip signal processor 8, and voltage command signal transmitter 9 may be conventional computer processors programmed to compute the slip, optimum slip, and voltage in accordance with the present invention. The slip signal processor 7 stores therein a program expressed by equation (1) below which determines a slip S(n) at a certain time point (n) during operation of the induction motor 3 on the basis of the voltage signal $V_1(n)$, the current signal $I_1(n)$, and the frequency signal f(n) detected by detector 6, and a motor constant.

$$S(n) = \frac{R_1 \cdot X_m(n) + \sqrt{(R_1 \cdot X_m(n))^2 + \left\{ \left( \frac{V_1(n)}{I_1(n)} \right)^2 - (R_1^2 + X_1^2(n)) \right\} \cdot \left[ \{R_1^2 + (X_1(n) + X_m(n))^2\} - \left( \frac{V_1(n)}{I_1(n)} \right)^2 \right]}}{\left\{ \left( \frac{V_1(n)}{I_1(n)} \right)^2 - (R_1^2 + X_1^2(n)) \right\} \cdot \left\{ \frac{X_m(n)}{R_{21}} \right\}} \quad (1)$$

The optimum slip signal processor 8 stores therein a program expressed by equation (2) below which determines the optimum slip S* (n+1) at the next time point (n+1).

$$S^*(n+1) = \frac{\left( \frac{R_{21}}{X_m(n+1)} \right)^2}{\frac{R_{21}}{R_1} + 1} \left\{ \sqrt{\frac{\frac{R_{21}}{R_1} + \left( \frac{R_{21}}{X_m(n+1)} \right)^2 + 1}{\left( \frac{R_{21}}{X_m(n+1)} \right)^2}} - 1 \right\} \quad (2)$$

The voltage command signal transmitter 9 stores therein a program expressed by equation (3) below which determines a scalar value |V₁(n+1)| of the voltage command signal at the next time point (n+1) from a scalar value |V₁(n)| of the voltage command signal at the certain time point on the basis of the slip S(n) given by equation (1) and the optimum slip S* (n+1) given by equation (2).

$$|V_1|(n+1) = \sqrt{\frac{S(n) \cdot f(n) \left( \left\{ R_1 - \left( \frac{X_1^*(n) \cdot X_m^*(n)}{R_{21}} \right) S^*(n+1) \right\}^2 + \left\{ X_1^*(n) + X_m^*(n) + \left( \frac{R_1 \cdot X_m^*(n)}{R_{21}} \right) S^*(n+1) \right\}^2 \right)}{S^*(n+1) \cdot f^*(n+1) \left( \left\{ R_1 - \left( \frac{X_1(n) \cdot X_m(n)}{R_{21}} \right) S(n) \right\}^2 + \left\{ X_1(n) + X_m(n) + \left( \frac{R_1 \cdot X_m(n)}{R_{21}} \right) S(n) \right\}^2 \right)}} \times |V_1|(n) \quad (3)$$

The scalar value |V₁(n+1)| of the voltage command signal is applied to the power transducer 1 which thereupon applies the three-phrase induction motor 3 with the primary voltage V₁(n+1) for the next time point (n+1).

Figure 2:
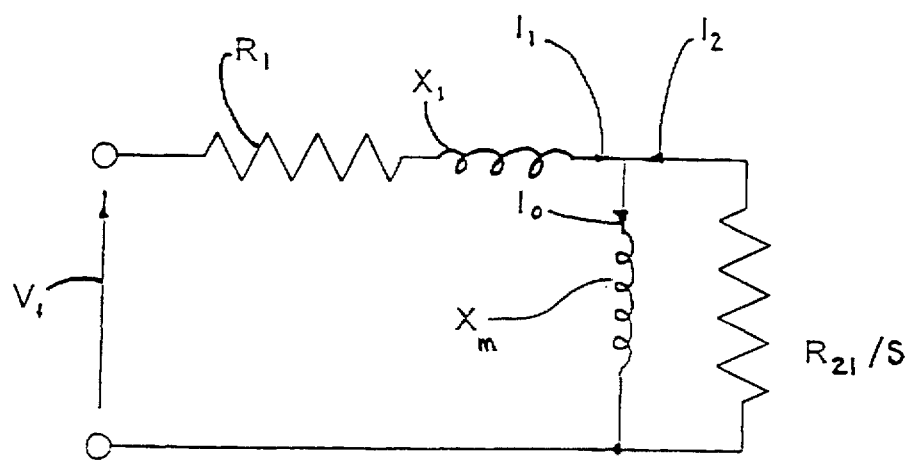
FIG. 2 is a circuit diagram illustrating an equivalent circuit used for formulation of equations representing real slip, optimum slip and voltage command signal, respectively.

FIG. 2 shows an interphase equivalent circuit of the three-phase induction motor 3. There is shown a mutual reactance $X_m$ substantially at a center of the figure. The left hand with respect to this mutual reactance $X_m$ is a primary side (stator) of the induction motor 3 including a primary resistor $R_1$ (motor constant) and the right hand is a secondary side (rotor) of induction motor 3 including a secondary resistor $R_{21}$ (motor constant). In this equivalent circuit, the secondary side is made equivalent to the primary side by dividing a value of the secondary resistor $R_{21}$ by a value of the slip S.

The power transducer 1 applies the induction motor 3 with the primary voltage $V_1$ and the primary current $I_1$ via the primary resistor $R_1$ and a primary leakage reactance $X_1$. Reference symbol $I_2$ designates a secondary current and reference symbol $I_0$ designates an excitation current. Secondary current $I_2$ and excitation current $I_0$ are calculated by utilizing the equivalent circuit.

Utilizing the equivalent circuit, equations (1), (2), and (3) were formulated. It should be understood that, in the following description of this formulation, suffix symbols such as bracketed n indicating respective time points during operation of the induction motor 3 will be omitted. Obviously, such suffix symbols will be omitted also in the case which is independent of any particular time point.

To formulate equations (1), (2), and (3), parametric equations A(S) and B(S) given by the following equations, respectively, were introduced:

$$A(S) = R_1 - X_1 \left( \frac{X_m}{R_{21}} \right) \cdot S \quad (4)$$

$$B(S) = R_1 \left( \frac{X_m}{R_{21}} \right) \cdot S + (X_1 + X_m) \quad (5)$$

While these parametric equations A(S) and B(S) contain the slip S as the most important variable, the mutual reactance $X_m$ and the primary leakage reactance $X_1$ also vary in proportion to the frequency f. $X_m$ is calculated by multiplying a mutual inductance $L_m$ (motor constant) by $2\pi f$ and $X_1$ is calculated on the basis of the primary leakage inductance $L_1$ (motor constant) and the frequency f. It should be understood here that these two variables are dependant on the slip S, as will be described.

Scalar values |V₁|, |I₁|, and |I₀| of the primary voltage, the primary current, and the excitation current, respectively, are related to one another as indicated by the following equations:

$$|V_1| = |I_0| \sqrt{A^2(S) + B^2(S)} \quad (6)$$

$$|I_1| = |I_0| \sqrt{1 + \left( \frac{X_m}{R_{21}} \right)^2 \cdot S^2} \quad (7)$$

These equations present one of basal formulae essential for formulation of equations which will be described below.

Important operational parameters of the three-phase induction motor 3, i.e., a motor output torque $T_{qm}$, a motor output $P_o$, a supplied power $P_i$ and a motor efficiency $\eta_m (\eta_m = P_o/P_i)$ can be calculated according to the following equations:

$$T_{qm} = \frac{3P \cdot 2\pi \cdot L_m^2 \cdot f \cdot S}{2R_{21} \left[ \left\{ R_1 - \left( \frac{X_1 \cdot X_m}{R_{21}} \right) S \right\}^2 + \left\{ X_1 + X_m + \left( \frac{R_1 \cdot X_m}{R_{21}} \right) S \right\}^2 \right]} \times |V_i|^2 \quad (8)$$

$$P_o = 3(1-S) \left( \frac{X_m^2}{R_{21}} \right) S \times |U_o|^2 \quad (9)$$

$$P_i = 3 \left\{ \left( \frac{X_m}{R_{21}} \right)^2 R_1 \cdot S^2 + \left( \frac{X_m^2}{R_{21}} \right) S + R_1 \right\} \times |U_o|^2 \quad (10)$$

$$\eta_m = \frac{-\left(\frac{X_m^2}{R_{21}}\right)S^2 + \left(\frac{X_m^2}{R_{21}}\right)S}{\left(\frac{X_m}{R_{21}}\right)^2 R_1 \cdot S^2 + \left(\frac{X_m^2}{R_{21}}\right)S + R_1} \quad (11)$$

These four equations have slip S as the most important variable. In equation (8), P represents the number of poles of an induction motor. Typically, P is a constant of 2, 4, or 6. $\eta_m$ given by equation (11) was differentiated in regard to the slip S and the optimum slip S* leading this differential equation to zero was determined according to an equation:

$$S^* = \frac{\left(\frac{R_{21}}{X_m}\right)^2}{\frac{R_{21}}{R_1}+1}\left\{\sqrt{\frac{\frac{R_{21}}{R_1}+\left(\frac{R_{21}}{X_m}\right)^2+1}{\left(\frac{R_{21}}{X_m}\right)^2}}-1\right\} \quad (12)$$

The optimum slip S* corresponds to the slip S which should achieve the maximum motor efficiency $\eta_m$. Specifically, when the slip corresponds to the optimum slip S*, the motor efficiency $\eta_m(S^*)$ takes the maximum value as given by an equation:

$$\eta_m(S^*) = \frac{-\frac{R_{21}}{R_1}S^{*2}+\left(\frac{R_{21}}{R_1}\right)S^*}{S^{*2}+\left(\frac{R_{21}}{R_1}\right)S^*+\left(\frac{R_{21}}{X_m}\right)^2} \quad (13)$$

Details of the variables added with the suffix * will be described later. The invention aims to control the induction motor so that the state of equations (12) and (13) may be maintained at every time point during operation of the induction motor. To achieve this, parametric equations $A_1(n)$ and $A_2(n)$ expressed by the following equations, respectively, were introduced:

$$A_1(n) = \left(\frac{V_1(n)}{I_1(n)}\right)^2 - (R_1^2 + X_1^2(n)) \quad (14)$$

$$A_2(n) = \{R_1^2 + (X_1(n) + X_m(n))^2\} - \left(\frac{V_1(n)}{I_1(n)}\right)^2 \quad (15)$$

These parametric equations $A_1(n)$ and $A_2(n)$ conveniently facilitate calculation of the slip and the voltage command signal at every time point during operation of the induction motor. Utilizing these parametric equations $A_1(n)$ and $A_2(n)$, the slip $S(n)$ at a certain time point (n) during operation of the induction motor can be expressed by an equation:

$$S(n) = \frac{R_1 \cdot X_m(n) + \sqrt{(R_1 \cdot X_m(n))^2 + A_1(n) \cdot A_2(n)}}{A_1(n) \cdot \left(\frac{X_m(n)}{R_{21}}\right)} \quad (16)$$

The previously mentioned equation (1) corresponds to an expansion of equation (16) and gives the slip of the induction motor at a certain time point (n) during operation thereof. The optimum slip S* (n) providing the maximum efficiency $\eta_m$ at a certain time point (n) is obtained by generalizing equation (12) in regard to the time point. The previously mentioned equation (2) is similar to the equation (14) except that the optimum slip S* is added with the suffix (n+1) which represents the next time point. More specifically, S* is replaced by S* (n+1) and the mutual impedance $X_m$ is replaced by $X_m$(n+1), allowing the optimum slip at the next time point (n+1) to be calculated.

Now a relationship established upon starting of the induction motor 3 between the primary voltage $V_1$, the slip S(1), and the load torque $T_{qL}(1)$, on one hand, and the induction motor output $T_{qm}(1)$, on the other hand, will be described. The slip S (1) at the time point of starting is expressed by an equation:

$$S(1) = \frac{R_1 \cdot X_m(1) + \sqrt{(R_1 \cdot X_m(1))^2 + A_1(1)A_2(1)}}{A_1(1)\left(\frac{X_m(1)}{R_{21}}\right)} \quad (17)$$

In equation (17), the symbol (n) representing a certain time point in equation (16) is replaced by the symbol (1) representing the time point of starting.

An initial value $T_{qL}(1)$ of the load torque is given by an equation:

$$T_{qL}(1) = \frac{3P \cdot 2\pi \cdot L_m^2 \cdot f(1) \cdot S(1)}{2R_1\left[\left\{R_1 - \left(\frac{X_1(1) \cdot X_m(1)}{R_{21}}\right)S(1)\right\}^2 + \left\{X_1(1) + X_m(1) + \left(\frac{R_1 \cdot X_m(1)}{R_{21}}\right)S(1)\right\}^2\right]} \times |V_1|^2 \quad (18)$$

Equation (18) is obtained by substituting equation (17) for the well known formula of motor load torque and includes a scalar value of the primary voltage $V_1$ applied to the induction motor 3 and the slip S as important variables.

An initial value $T_{qm}(1)$ of the induction motor output torque is given by an equation:

$$T_{qm}(1) = \frac{3P \cdot 2\pi \cdot L_m^2 \cdot f^*(1) \cdot S^*(1)}{2R_1\left[\left\{R_1 - \left(\frac{X_1^*(1) \cdot X_m^*(1)}{R_{21}}\right)S^*(1)\right\}^2 + \left\{X_1^*(1) + X_m^*(1) + \left(\frac{R_1 \cdot X_m^*(1)}{R_{21}}\right)S^*(1)\right\}^2\right]} \times |V_1^*|^2 \quad (19)$$

Equation (19) is obtained by substituting equation (17) for the well known formula of motor torque and includes a scalar value $|V_1^*|$ of the primary voltage and the optimum slip S* (1) as important variables. This scalar value $|V_1^*|$ of the primary voltage corresponds to the optimum voltage command signal to make the induction motor output torque $T_{qm}(1)$ at the time point of starting in coincidence with the load torque $T_{qL}(1)$ at the next time point. The optimum slip S* (1) corresponds to the slip with which the maximum efficiency is achieved.

Making the induction motor output torque $T_{qm}(1)$ given by the equation (19) in coincidence with the load torque $T_{qL}(1)$ at the time point of starting which is given by the equation (18), the following equation (20) was formulated:

$$|V_1|(2) = \sqrt{\frac{S(1) \cdot f(1) \left[ \left\{ R_1 \left( \frac{X_1^*(1) \cdot X_m^*(1)}{R_{21}} \right) S^*(2) \right\}^2 + \left\{ X_1^*(1) + X_m^*(1) + \left( \frac{R_1 \cdot X_m^*(1)}{R_{21}} \right) S^*(2) \right\}^2 \right]}{S^*(2) \cdot f^*(2) \left[ \left\{ R_1 - \left( \frac{X_1(1) \cdot X_m(1)}{R_{21}} \right) S(1) \right\}^2 + \left\{ X_1(1) + X_m(1) + \left( \frac{R_1 \cdot X_m(1)}{R_{21}} \right) S(1) \right\}^2 \right]}} \times |V_1|(1) \quad (20)$$

In formulation of equation (20), $|V_1^*|$ of the primary voltage given by equation (19) was replaced by the scalar value $|V_1|(2)$ of the voltage command signal at the next time point and the suffix of the optimum slip S* was replaced by the suffix representing the next time point.

Equation (20) is used to determine, immediately after starting, a scalar value $|V_1|(2)$ of the voltage command signal at the next time point on the basis of the voltage signal $V_1(1)$, the current signal $I_1(1)$, the slip S(1) at the time point of starting. The previously mentioned equation (3) corresponds to equation (20) generalized in regard to the time point.

With the efficiency control system of the present invention for an induction motor, the real-time control begins upon starting of the induction motor in accordance with the equation solving program stored in the voltage command signal transmitter, by which the slip at the next time point is adjusted to the optimum value and the output torque of the induction motor is made coincident with the load torque. Then, such real-time control is repeated. According to this system, the voltage command signal serving to control the induction motor in real time to operate with the optimum slip is transmitted to the power transducer in response to variation in the load torque at every time point during operation of the induction motor such that the induction motor may be controlled to operate at the maximum efficiency and stability.

According to the system as has been described hereinabove, a condition required to achieve the maximum efficiency is determined on the basis of the slip S as the most important variable so that this system may cooperate with the power transducer to control the induction motor to operate at the maximum efficiency. The slip S is the control factor for this system.

In formulation of the equations as have been described, iron loss, copper loss, and mechanical loss are neglected. Alternatively, it is possible to formulate the equation used for calculation of the slip, the equation used for calculation of the optimum slip and the equation used for calculation of the voltage command signal with due regard to, for example, the iron loss and the copper loss. The equivalent circuit also is not limited to the embodiment as has been described in reference to FIG. 2.

The power transducer cooperating with the efficiency control system of the present invention for the induction motor is not limited to the above-described inverter and may be a power transducer of a suitable type depending on characteristics of the particular load. For example, the inverter may be employed as the power transducer when the load torque repeatedly varies as in a compressor or a refrigerator, and a power transducer relying on phase control of a thyristor circuit or AC switch control may be employed when a variation in the load torque is relatively small. Additionally, a power transducer having a constant output frequency may also be employed.

In the previously mentioned equations, the frequency f, the mutual impedance $X_m$ and, the primary leakage impedance $X_1$ appear. This frequency f represents the frequency of power supplied from the power transducer. Depending on the condition at every time point during operation of the induction motor, the frequency of power supplied from the power transducer may vary. Such variation is caused by control of the slip S as well as variation in the load torque. Specifically, variation in the frequency f depends on control of the slip S. The symbol representing the time point added to the frequency f indicates the fact that the frequency f varies with time, and the suffix * representing the optimum frequency indicates the frequency associated with the optimum slip. This is also true for the mutual impedance and the primary leakage impedance. The term f* (n+1) in equation (3) is determined at the time of feedback of an amount of control to the electric power converter according to variations of a load torque which is the object of the efficiency control system of the induction motor of the present invention. For example, where the load is a driving motor of a refrigerating machine, the frequency (f) is made larger or smaller in order to increase or decrease the refrigerating capacity.

The efficiency control system for the induction motor of the present invention allows the induction motor to be controlled in real time in at every time point during operation thereof to operate with the optimum slip depending on variation in the load torque. The present invention also cooperates with the power transducer in real time, to control the induction motor to operate at the maximum efficiency and stability since the efficiency control system of the invention comprises, as will be apparent from the foregoing description, a slip signal processor for calculating an actual slip of the induction motor during its operation on the basis of voltage signal, current signal, and frequency signal of electric power supplied from a power transducer to the induction motor and a motor constant, an optimum slip signal processor for calculating the optimum slip desired to obtain the maximum efficiency of the induction motor, and a voltage command signal transmitter for generating and transmitting a voltage command signal to the power transducer and the slip is controlled to be maintained at the optimum value so that the induction motor may operate at the maximum efficiency depending on a load torque. The present invention also allows the power transducer to be selected to be most suitable for characteristics of the particular load.

The above described embodiment was chosen for purposes of describing but one application of the invention. It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. An efficiency control system for an induction motor system having an induction motor, a power transducer connected to said induction motor, and a detector adapted for separate real-time detection of a voltage signal, a current signal, and a frequency signal of electric power supplied from said power transducer to said induction motor so that an output of said induction motor during operation may be controlled by these signals in response to a load torque, said efficiency control system comprising:

an actual slip signal processor for calculating an actual slip of said induction motor during operation on the basis of the voltage signal, current signal, and frequency signal of the electric power supplied from said power transducer to said induction motor and a motor constant;

an optimum slip signal processor for calculating an optimum slip desired to obtain the maximum efficiency of said induction motor; and a voltage command signal transmitter for generating and transmitting a voltage command signal to said power transducer, wherein said voltage command signal includes a scalar value calculated by said voltage command signal transmitter, wherein said power transducer adjusts the electrical power supplied to said induction motor in response to said scalar value of said voltage command signal such that the slip of said induction motor is maintained at the optimum value in order to operate said induction motor at the maximum efficiency for a given load torque.

2. The efficiency control system as defined in claim 1, wherein said actual slip signal processor calculates the actual slip S(n) at a particular point in time n, of said induction motor using the equation:

$$S(n) = \frac{R_1 \cdot X_m(n) + \sqrt{(R_1 \cdot X_m(n))^2 + \left\{ \left(\frac{V_1(n)}{I_1(n)}\right)^2 - (R_1^2 + X_1^2(n)) \right\} \cdot \left[ \{R_1^2 + (X_1(n) + X_m(n))^2\} - \left(\frac{V_1(n)}{I_1(n)}\right)^2 \right]}}{\left\{ \left(\frac{V_1(n)}{I_1(n)}\right)^2 - (R_1^2 + X_1^2(n)) \right\} \cdot \left\{ \frac{X_m(n)}{R_{21}} \right\}} \quad (1)$$

where $V_1(n)$ represents the voltage level of the detected voltage signal at time n, $I_1(n)$ represents the current level of the detected current signal at time n, $R_1$ represents a motor constant, which is the resistance of the stator of said induction motor, $R_{21}$ represents a motor constant, which is the resistance of the rotor of said induction motor, $X_1(n)$ represents a primary leakage reactance of said stator at time n, and $X_m(n)$ represents a mutual reactance of said stator and rotor at time n.

$$S^*(n+1) = \frac{\left(\frac{R_{21}}{X_m(n+1)}\right)^2}{\frac{R_{21}}{R_1} + 1} \left\{ \sqrt{\frac{\frac{R_{21}}{R_1} + \left(\frac{R_{21}}{X_m(n+1)}\right)^2 + 1}{\left(\frac{R_{21}}{X_m(n+1)}\right)^2}} - 1 \right\} \quad (2)$$

where $X_m(n+1)$ represents a mutual reactance of said stator and rotor at time n+1, and wherein said voltage command signal transmitter calculates the scalar value $|V_1|(n+1)$ for a particular point in time n+1 occurring after a present time n, using the equation:

$$|V_1|(n+1) = \sqrt{\frac{S(n) \cdot f(n) \left( \left\{ R_1 - \left(\frac{X_1^*(n) \cdot X_m^*(n)}{R_{21}}\right) S^*(n+1) \right\}^2 + \left\{ X_1^*(n) + X_m^*(n) + \left(\frac{R_1 \cdot X_m^*(n)}{R_{21}}\right) S^*(n+1) \right\}^2 \right)}{S^*(n+1) \cdot f^*(n+1) \left( \left\{ R_1 - \left(\frac{X_1(n) \cdot X_m(n)}{R_{21}}\right) S(n) \right\}^2 + \left\{ X_1(n) + X_m(n) + \left(\frac{R_1 \cdot X_m(n)}{R_{21}}\right) S(n) \right\}^2 \right)}} \times |V_1|(n) \quad (3)$$

where S(n) represents the actual slip calculated by said actual slip signal processor at time n, S*(n+1) represents the optimum slip calculated by said optimum slip signal processor for time n+1, $X_m^*$(n) represents the optimum mutual reactance of said stator and rotor at time n, $|V_1|$(n) represents a scalar value of the voltage level of the detected voltage signal at time n, $X_1^*$(n) represents the optimum primary leakage reactance of said stator at time n, f(n) represents the frequency of the detected frequency signal at time n, and f*(n+1) represents an optimum frequency associated with the optimum slip S* (n+1) for the time n+1.

3. The efficiency control system as defined in claim 1, wherein said actual slip signal processor calculates the actual slip S(n) at a particular point in time n, of said induction motor using the equation:

$$S(n) = \frac{R_1 \cdot X_m(n) + \sqrt{(R_1 \cdot X_m(n))^2 + \left\{ \left(\frac{V_1(n)}{I_1(n)}\right)^2 - (R_1^2 + X_1^2(n)) \right\} \cdot \left[ \{R_1^2 + (X_1(n) + X_m(n))^2\} - \left(\frac{V_1(n)}{I_1(n)}\right)^2 \right]}}{\left\{ \left(\frac{V_1(n)}{I_1(n)}\right)^2 - (R_1^2 + X_1^2(n)) \right\} \cdot \left\{ \frac{X_m(n)}{R_{21}} \right\}} \quad (1)$$

wherein said optimum slip signal processor calculates the optimum slip S*(n+1) at a particular point in time n+1 occurring after time n, using the equation:

where $V_1(n)$ represents the voltage level of the detected voltage signal at time n, $I_1(n)$ represents the current level of the detected current signal at time n, $R_1$ represents a motor constant, which is the resistance of the stator of said induction motor, $R_{21}$ represents a motor constant, which is the resistance of the rotor of said induction motor, $X_1(n)$ represents a primary leakage reactance of said stator at time n, and $X_m(n)$ represents a mutual reactance of said stator and rotor at time n.

4. The efficiency control system as defined in claim 1, wherein said optimum slip signal processor calculates the optimum slip $S^*$ (n+1) at a particular point in time n+1 occurring after time n, using the equation:

$$S^*(n+1) = \frac{\left(\frac{R_{21}}{X_m(n+1)}\right)^2}{\frac{R_{21}}{R_1}+1}\left\{\sqrt{\frac{\frac{R_{21}}{R_1}+\left(\frac{R_{21}}{X_m(n+1)}\right)^2+1}{\left(\frac{R_{21}}{X_m(n+1)}\right)^2}}-1\right\} \quad (2)$$

where $R_1$ represents a motor constant, which is the resistance of the stator of said induction motor, $R_{21}$ represents a motor constant, which is the resistance of the rotor of said induction motor, and $X_m(n+1)$ represents a mutual reactance of said stator and rotor at time n+1.

5. The efficiency control system as defined in claim 1, wherein said voltage command signal transmitter calculates the scalar value $|V_1|(n+1)$ for a particular point in time n+1 occurring after a present time n, using the equation:

$$|V_1|(n+1) = \sqrt{\frac{S(n) \cdot f(n)\left(\left\{R_1-\left(\frac{X_1^*(n) \cdot X_m^*(n)}{R_{21}}\right)S^*(n+1)\right\}^2+\left\{X_1^*(n)+X_m^*(n)+\left(\frac{R_1 \cdot X_m^*(n)}{R_{21}}\right)S^*(n+1)\right\}^2\right)}{S^*(n+1) \cdot f^*(n+1)\left(\left\{R_1-\left(\frac{X_1(n) \cdot X_m(n)}{R_{21}}\right)S(n)\right\}^2+\left\{X_1(n)+X_m(n)+\left(\frac{R_1 \cdot X_m(n)}{R_{21}}\right)S(n)\right\}^2\right)}} \times |V_1|(n) \quad (3)$$

where $R_1$ represents a motor constant, which is the resistance of the stator of said induction motor, $R_{21}$ represents a motor constant, which is the resistance of the rotor of said induction motor, S(n) represents the actual slip calculated by said actual slip signal processor at time n, $S^*$ (n+1) represents the optimum slip calculated by said optimum slip signal processor for time n+1, $X_m(n)$ represents a mutual reactance of said stator and rotor at time n, $X_m^*$ (n) represents the optimum mutual reactance of said stator and rotor at time n, $|V_1|(n)$ represents a scalar value of the voltage level of the detected voltage signal at time n, $X_1(n)$ represents a primary leakage reactance of said stator at time n, $X_1^*$ (n) represents the optimum primary leakage reactance of said stator at time n, f(n) represents the frequency of the detected frequency signal at time n, and $f^*$ (n+1) represents an optimum frequency associated with the optimum slip $S^*$ (n+1) for the time n+1.

6. A method increasing the efficiency of an induction motor system having an induction motor, a power transducer connected to said induction motor, and a detector adapted for separate real-time detection of a voltage signal, a current signal, and a frequency signal of electric power supplied from said power transducer to said induction motor so that an output of said induction motor during operation may be controlled by these signals in response to a load torque, said method comprising the steps of:

calculating an actual slip of said induction motor during operation on the basis of the voltage signal, current signal, and frequency signal of the electric power supplied from said power transducer to said induction motor and a motor constant;

calculating an optimum slip desired to obtain the maximum efficiency of said induction motor;

generating and transmitting a voltage command signal to said power transducer, wherein said voltage command signal includes a scalar value calculated by said voltage command signal transmitter; and adjusting the electrical power supplied to said induction motor in response to said scalar value of said voltage command signal such that the slip of said induction motor is maintained at the optimum value in order to operate said induction motor at the maximum efficiency for a given load torque.

7. The method as defined in claim 6, wherein the actual slip S(n) at a particular point in time n, of said induction motor is calculated using the equation:

$$S(n) = \frac{R_1 \cdot X_m(n) + \sqrt{(R_1 \cdot X_m(n))^2+\left\{\left(\frac{V_1(n)}{I_1(n)}\right)^2-(R_1^2+X_1^2(n))\right\} \cdot \left[\{R_1^2+(X_1(n)+X_m(n))^2\}-\left(\frac{V_1(n)}{I_1(n)}\right)^2\right]}}{\left\{\left(\frac{V_1(n)}{I_1(n)}\right)^2-(R_1^2+X_1^2(n))\right\} \cdot \left\{\frac{X_m(n)}{R_{21}}\right\}} \quad (1)$$

where $V_1(n)$ represents the voltage level of the detected voltage signal at time n, $I_1(n)$ represents the current level of the detected current signal at time n, $R_1$ represents a motor constant, which is the resistance of the stator of said induction motor, $R_{21}$ represents a motor constant, which is the resistance of the rotor of said induction motor, $X_1(n)$ represents a primary leakage reactance of said stator at time n, and $X_m(n)$ represents a mutual reactance of said stator and rotor at time n.

wherein the optimum slip $S^*$ (n+1) at a particular point in time n+1 occurring after time n, is calculated using the equation:

$$S^*(n+1) = \dfrac{\left(\dfrac{R_{21}}{X_m(n+1)}\right)^2}{\dfrac{R_{21}}{R_1}+1} \left\{ \sqrt{\dfrac{\dfrac{R_{21}}{R_1}+\left(\dfrac{R_{21}}{X_m(n+1)}\right)^2+1}{\left(\dfrac{R_{21}}{X_m(n+1)}\right)^2}} - 1 \right\} \qquad (2)$$

where $X_m(n+1)$ represents a mutual reactance of said stator and rotor at time n+1, and wherein the scalar value $|V_1|(n+1)$ for a particular point in time n+1 occurring after a present time n, is calculated using the equation:

$$|V_1|(n+1) = \sqrt{\dfrac{S(n)\cdot f(n)\left(\left\{R_1-\left(\dfrac{X_1^*(n)\cdot X_m^*(n)}{R_{21}}\right)S^*(n+1)\right\}^2 + \left\{X_1^*(n)+X_m^*(n)+\left(\dfrac{R_1\cdot X_m^*(n)}{R_{21}}\right)S^*(n+1)\right\}^2\right)}{S^*(n+1)\cdot f^*(n+1)\left(\left\{R_1-\left(\dfrac{X_1(n)\cdot X_m(n)}{R_{21}}\right)S(n)\right\}^2 + \left\{X_1(n)+X_m(n)+\left(\dfrac{R_1\cdot X_m(n)}{R_{21}}\right)S(n)\right\}^2\right)}} \times |V_1|(n) \qquad (3)$$

where S(n) represents the actual slip at time n, S* (n+1) represents the optimum slip for time n+1, $X_m^*$ (n) represents the optimum mutual reactance of said stator and rotor at time n, $|V_1|(n)$ represents a scalar value of the voltage level of the detected voltage signal at time n, $X_1^*$ (n) represents the optimum primary leakage reactance of said stator at time n, f(n) represents the frequency of the detected frequency signal at time n, and f*(n+1) represents an optimum frequency associated with the optimum slip S*(n+1) for the time n+1.

8. The method as defined in claim 6, wherein the actual slip S(n) at a particular point in time n, of said induction motor is calculated using the equation:

$$S(n) = \dfrac{R_1\cdot X_m(n) + \sqrt{(R_1\cdot X_m(n))^2 + \left\{\left(\dfrac{V_1(n)}{I_1(n)}\right)^2 - (R_1^2+X_1^2(n))\right\}\cdot\left[\{R_1^2+(X_1(n)+X_m(n))^2\} - \left(\dfrac{V_1(n)}{I_1(n)}\right)^2\right]}}{\left\{\left(\dfrac{V_1(n)}{I_1(n)}\right)^2 - (R_1^2+X_1^2(n))\right\}\cdot\left\{\dfrac{X_m(n)}{R_{21}}\right\}} \qquad (1)$$

where $V_1(n)$ represents the voltage level of the detected voltage signal at time n, $I_1(n)$ represents the current level of the detected current signal at time n, $R_1$ represents a motor constant, which is the resistance of the stator of said induction motor, $R_{21}$ represents a motor constant, which is the resistance of the rotor of said induction motor, $X_1(n)$ represents a primary leakage reactance of said stator at time n, and $X_m(n)$ represents a mutual reactance of said stator and rotor at time n.

9. The method as defined in claim 6, wherein the optimum slip S*(n+1) at a particular point in time n+1 occurring after time n, is calculated using the equation:

$$S^*(n+1) = \dfrac{\left(\dfrac{R_{21}}{X_m(n+1)}\right)^2}{\dfrac{R_{21}}{R_1}+1} \left\{ \sqrt{\dfrac{\dfrac{R_{21}}{R_1}+\left(\dfrac{R_{21}}{X_m(n+1)}\right)^2+1}{\left(\dfrac{R_{21}}{X_m(n+1)}\right)^2}} - 1 \right\} \qquad (2)$$

where $R_1$ represents a motor constant, which is the resistance of the stator of said induction motor, $R_{21}$ represents a motor constant, which is the resistance of the rotor of said induction motor, and $X_m(n+1)$ represents a mutual reactance of said stator and rotor at time n+1.

10. The method as defined in claim 6, wherein the scalar value $|V_1|(n+1)$ for a particular point in time n+1 occurring after a present time n, is calculated using the equation:

$$|V_1|(n+1) = \sqrt{\dfrac{S(n)\cdot f(n)\left(\left\{R_1-\left(\dfrac{X_1^*(n)\cdot X_m^*(n)}{R_{21}}\right)S^*(n+1)\right\}^2 + \left\{X_1^*(n)+X_m^*(n)+\left(\dfrac{R_1\cdot X_m^*(n)}{R_{21}}\right)S^*(n+1)\right\}^2\right)}{S^*(n+1)\cdot f^*(n+1)\left(\left\{R_1-\left(\dfrac{X_1(n)\cdot X_m(n)}{R_{21}}\right)S(n)\right\}^2 + \left\{X_1(n)+X_m(n)+\left(\dfrac{R_1\cdot X_m(n)}{R_{21}}\right)S(n)\right\}^2\right)}} \times |V_1|(n) \qquad (3)$$

where $R_1$ represents a motor constant, which is the resistance of the stator of said induction motor, $R_{21}$ represents a motor constant, which is the resistance of the rotor of said induction motor, S(n) represents the actual slip at time n, S*(n+1) represents the optimum slip for time n+1, $X_m(n)$ represents a mutual reactance of said stator and rotor at time n, $X_m^*(n)$ represents the optimum mutual reactance of said stator and rotor at time n, $|V_1|(n)$ represents a scalar value of the voltage level of the detected voltage signal at time n, $X_1(n)$ represents a primary leakage reactance of said stator at time n, $X_1^*(n)$ represents the optimum primary leakage reactance of said stator at time n, f(n) represents the frequency of the detected frequency signal at time n, and $f^*(n+1)$ represents an optimum frequency associated with the optimum slip $S^*(n+1)$ for the time n+1.

* * * * *